US011692512B2

United States Patent
Guillotel et al.

(10) Patent No.: US 11,692,512 B2
(45) Date of Patent: Jul. 4, 2023

(54) FAN MODULE EQUIPPED WITH AN ELECTRICAL MACHINE FOR AN AIRCRAFT TURBINE ENGINE

(71) Applicant: SAFRAN AIRCRAFT ENGINES, Paris (FR)

(72) Inventors: Loic Paul Yves Guillotel, Moissy-Cramayel (FR); Tewfik Boudebiza, Moissy-Cramayel (FR); Gilles Alain Marie Charier, Moissy-Cramayel (FR); Caroline Marie Frantz, Moissy-Cramayel (FR); Vincent Francois Georges Millier, Moissy-Cramayel (FR)

(73) Assignee: SAFRAN AIRCRAFT ENGINES, Paris (FR)

(\*) Notice: Subject to any disclaimer, the term of this patent is extended or adjusted under 35 U.S.C. 154(b) by 0 days.

(21) Appl. No.: 17/287,857

(22) PCT Filed: Oct. 16, 2019

(86) PCT No.: PCT/FR2019/052457
§ 371 (c)(1),
(2) Date: Apr. 22, 2021

(87) PCT Pub. No.: WO2020/084225
PCT Pub. Date: Apr. 30, 2020

(65) Prior Publication Data
US 2021/0396193 A1    Dec. 23, 2021

(30) Foreign Application Priority Data
Oct. 26, 2018    (FR) .................................. 1859943

(51) Int. Cl.
*F02K 3/00*         (2006.01)
*F01D 15/10*        (2006.01)
*F02C 7/12*         (2006.01)

(52) U.S. Cl.
CPC ............... *F02K 3/00* (2013.01); *F01D 15/10* (2013.01); *F02C 7/12* (2013.01); *F05D 2220/323* (2013.01); *F05D 2230/61* (2013.01)

(58) Field of Classification Search
CPC ... F01D 15/10; F02C 7/32; F02C 7/06; B64D 2027/026
See application file for complete search history.

(56) References Cited

U.S. PATENT DOCUMENTS 6,467,725 B1\*  10/2002  Coles ..................... F01D 15/10
                                                         244/58
6,914,344 B2\*   7/2005  Franchet .............. H02K 7/1823
                                                         60/668

(Continued)

FOREIGN PATENT DOCUMENTS

EP    1382802 A1    1/2004
FR    2842565 A1    1/2004

OTHER PUBLICATIONS

International Preliminary Report on Patentability received for PCT Patent Application No. PCT/FR2019/052457, dated May 6, 2021, 13 pages (7 pages of English Translation and 6 pages of Original Document).

(Continued)

*Primary Examiner* — Alain Chau
(74) *Attorney, Agent, or Firm* — Womble Bond Dickinson (US) LLP

(57) ABSTRACT

A fan module for an aircraft turbine engine, this module comprising a fan and an electrical machine, such that the electrical machine is coaxially mounted downstream of the fan and comprises a rotor coupled to rotate with the fan and (Continued)

an annular member with generally C-shaped axial cross-section, the opening of which is axially orientated and receives the rotor, this member comprising a radially outer portion forming a stator, and a radially inner portion forming a support for bearings guiding the rotor.

13 Claims, 3 Drawing Sheets

(56) References Cited

U.S. PATENT DOCUMENTS

| | | | | |
|---|---|---|---|---|
| 8,829,702 | B1* | 9/2014 | Menheere | H02K 15/14 60/39.23 |
| 10,308,365 | B2* | 6/2019 | Cantemir | H02K 11/33 |
| 10,308,366 | B2* | 6/2019 | Kupiszewski | F02C 7/32 |
| 10,487,839 | B2* | 11/2019 | Kupiszewski | F01D 5/02 |
| 11,007,955 | B2* | 5/2021 | Klemen | F01D 15/10 |
| 11,014,513 | B2* | 5/2021 | Klemen | F01D 17/24 |
| 11,130,456 | B2* | 9/2021 | Klemen | H02K 7/1823 |
| 11,156,128 | B2* | 10/2021 | Miller | B64D 27/10 |
| 11,247,779 | B2* | 2/2022 | Kupiszewski | F02K 5/00 |
| 2004/0070211 | A1* | 4/2004 | Franchet | F02C 7/32 290/31 |
| 2006/0137355 | A1 | 6/2006 | Welch et al. | |
| 2007/0165971 | A1* | 7/2007 | Alam | F16C 33/6677 384/99 |
| 2007/0217905 | A1* | 9/2007 | Bouiller | H02K 5/225 415/122.1 |
| 2009/0309461 | A1* | 12/2009 | Berenger | H02K 19/38 310/67 R |
| 2010/0133835 | A1 | 6/2010 | Dooley et al. | |
| 2014/0373532 | A1* | 12/2014 | Diemer | F02B 37/10 60/607 |
| 2017/0334377 | A1* | 11/2017 | Klemen | H02P 9/04 |
| 2017/0335710 | A1 | 11/2017 | Klemen et al. | |
| 2017/0335795 | A1* | 11/2017 | Klemen | B60R 16/03 |
| 2018/0050806 | A1* | 2/2018 | Kupiszewski | F02C 7/24 |
| 2018/0051701 | A1* | 2/2018 | Kupiszewski | B64D 27/02 |
| 2018/0127103 | A1* | 5/2018 | Cantemir | F02C 7/32 |
| 2019/0145322 | A1* | 5/2019 | Sellick | F02C 7/36 290/52 |
| 2019/0217963 | A1* | 7/2019 | Kupiszewski | F04D 25/06 |
| 2020/0063606 | A1* | 2/2020 | Miller | F02C 6/14 |

OTHER PUBLICATIONS

International Search Report and Written Opinion received for PCT Patent Application No. PCT/FR2019/052457, dated Jan. 16, 2020, 16 pages (7 pages of English Translation and 9 pages of Original Document).

* cited by examiner

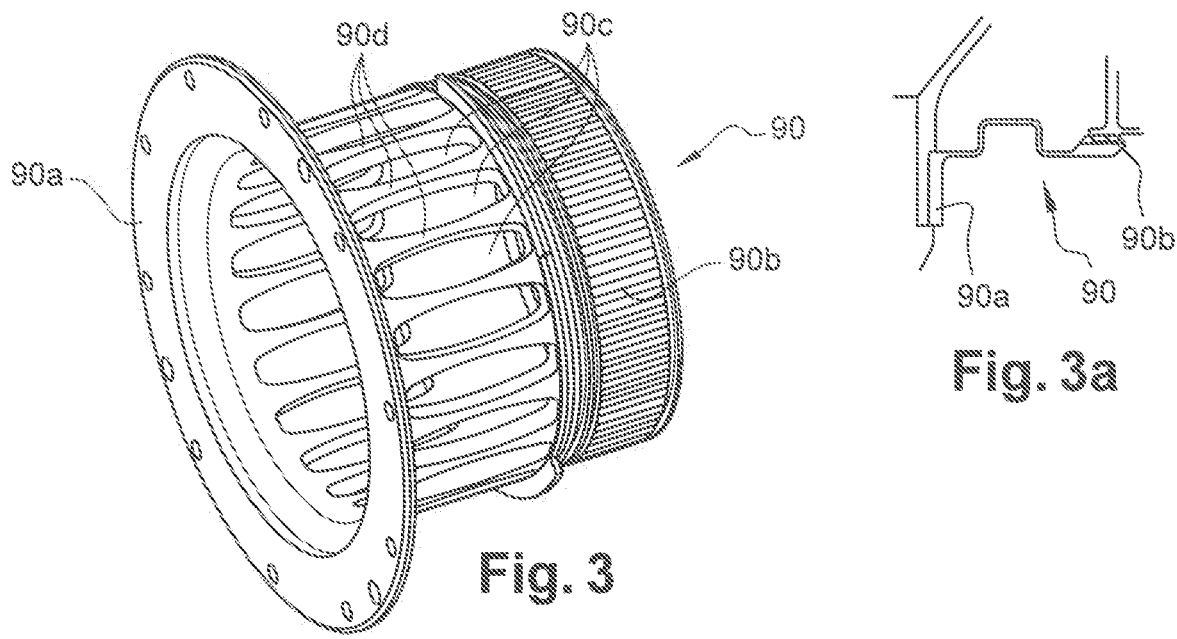
Fig. 3
Fig. 3a
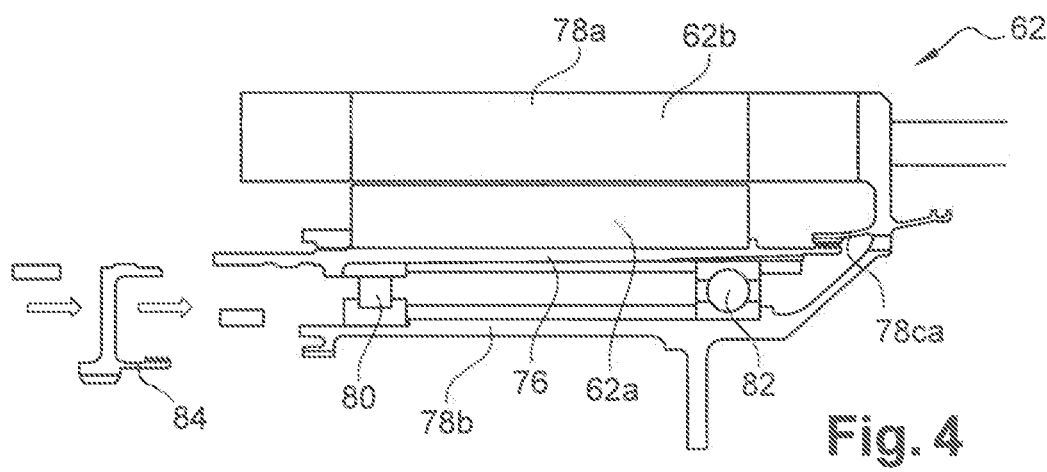
Fig. 4
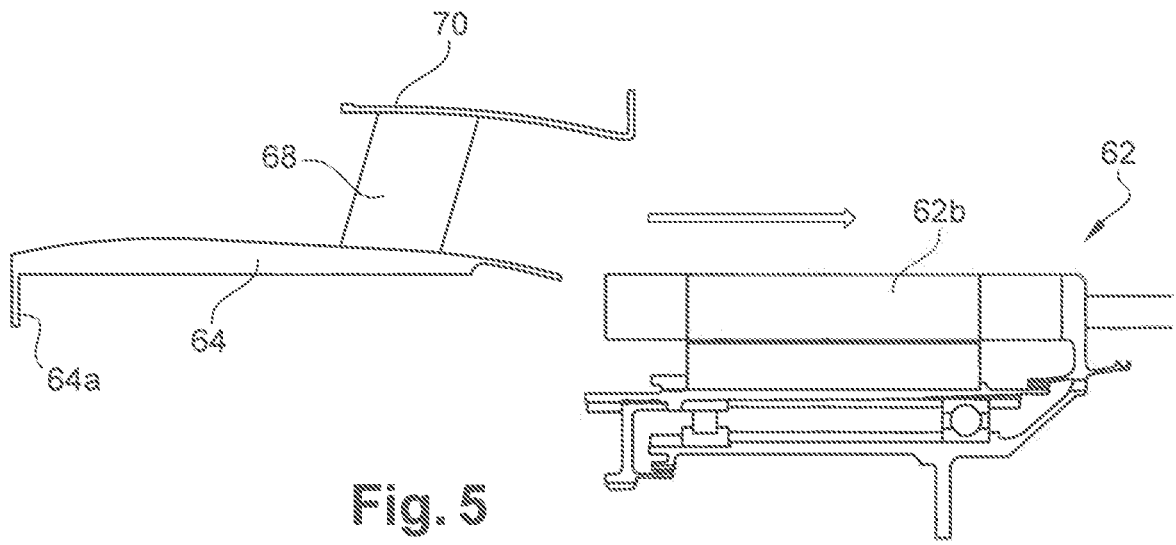
Fig. 5

FAN MODULE EQUIPPED WITH AN ELECTRICAL MACHINE FOR AN AIRCRAFT TURBINE ENGINE

TECHNICAL FIELD

The present invention relates to a fan module for an aircraft turbine engine, this module being equipped with an electrical machine.

BACKGROUND

The prior art comprises in particular the document FR-A1-2 842 565 which describes a turbine engine equipped with an electrical machine as well as the documents US-A1-2017/335710, US-A1-2006/137355, US-A1-2010/133835 and EP-A1-1382 802.

The aeronautical world is now asking many questions about the relevance of using hybrid engines for commercial aviation. The use of electrical energy is now being considered not only for functions of the aircraft but also for electrifying functions of the turbine engine.

This observation has led to the study of hybrid engine architecture solutions, combining fossil fuel energy and electrical energy to drive the propulsion part (turbine engine fan) and supply certain engine and/or aircraft functions.

These architectures can be based on a high bypass ratio and speed reducer type architecture, but also on a multiple body (2 or 3) architecture. In these architectures, the turbine engine comprises a low-pressure body and a high-pressure body, each body comprising a shaft connecting a rotor of a compressor to a rotor of a turbine.

It is known to equip an aircraft turbine engine with an electrical machine. It is recalled that an electrical machine is an electromechanical device based on electromagnetism allowing the conversion of electrical energy into mechanical energy or work, for example. This process is reversible and can be used to produce electricity.

Thus, depending on the end use of a machine, we use the terms:
generator to designate an electrical machine producing electrical energy from mechanical energy,
motor for an electrical machine producing mechanical energy from electrical energy.

An electrical machine can also behave in motor mode as well as in generator mode.

The integration of a high-powered electrical machine on the low-pressure body of a turbine engine, in particular of the high bypass ratio type, is very complex. Several installation areas are possible but the advantages and disadvantages of each are numerous and diverse (problem of mechanical integration of the machine, temperature resistance of the machine, accessibility of the machine, etc.).

The present invention offers a solution to at least some of the problems mentioned above.

SUMMARY OF THE INVENTION

The invention proposes a fan module for an aircraft turbine engine, this module comprising a fan and an electrical machine, characterised in that the electrical machine is coaxially mounted downstream of the fan and comprises a rotor coupled to rotate with the fan and an annular member with generally C-shaped axial cross-section, the opening of which is axially oriented and receives said rotor, this member comprising a radially outer portion forming a stator, and a radially inner portion forming a support for bearings guiding the rotor.

The present invention thus offers a solution for integrating an electrical machine, a first advantage being linked to the fact that in the integration area of this machine, ideally directly downstream of the fan and therefore upstream of the compressor or of the compressors, the temperatures prevailing there are relatively low and therefore optimal for this machine. In addition, the machine is cooled by air flows, which optimises the service life of the machine. The rotor of the machine is driven by the fan and is therefore at a relatively low speed, in particular if the turbine engine comprises a speed reducer. In addition, the machine is located as close as possible to the flow ducts and has a relatively large diameter and can therefore produce high power outputs compared to machines of prior technologies.

The module according to the invention may comprise one or more of the following characteristics, taken alone or in combination with each other:
the electrical machine is housed in an annular space bounded upstream by a fan disc, and downstream by another annular support of bearings guiding a fan shaft, said member is attached to said other bearing support, said member and said other bearing support comprising holes for oil discharge from the opening of the member axially downstream,
the rotor is carried by a substantially cylindrical support element, the downstream end of which sealingly cooperates with a bottom of the opening of said member, and the upstream end of which receives a closure element which sealingly cooperates with an upstream free end of said radially inner portion of the member,
said closure element comprises a series of internal rectilinear splines for coupling to a series of external rectilinear splines of a connecting element to a fan disc,
said connecting element comprises an annular row of radially through slots and/or said connecting element is generally bellows shaped in cross-section, to provide flexibility, in particular in torsion, to this connecting element; this enables to avoid the electrical machine to be hyperstatic and to make the electrical machine independent of the displacements of the fan shaft in operation,
the stator of the electrical machine is surrounded by a first annular shell which is connected by fixed vanes to a second annular shell extending around the first shell, these first and second shells delimiting between them an inlet of a flow duct of a primary flow,
the first shell has a radially outer annular surface which has an aerodynamic profile and which is swept by the main flow and/or the primary flow,
said stator is configured to be cooled by the main flow and/or the primary flow.

The present invention further relates to an aircraft turbine engine, comprising a gas generator and a fan module as described above, the fan module comprising a fan arranged upstream of the gas generator and configured to generate a main gas flow, a part of which flows into a duct of the gas generator to form a primary flow, and another part of which flows in a duct around the gas generator to form a secondary flow, the turbine engine further comprising an electrical machine, wherein said stator is configured to be cooled by the main flow and/or the primary flow.

The present invention further relates to a method of modular assembly of a turbine engine as described above, comprising the steps of:

a) assembling the electrical machine, b) mounting the electrical machine radially within the first shell, which is secured to the second shell by the fixed vanes, c) mounting the resulting assembly on a first annular support of bearings guiding a fan shaft, and d) connecting a fan disc to this fan shaft.

DESCRIPTION OF FIGURES

The invention will be better understood and other details, characteristics and advantages of the invention will become apparent from the following non-limiting description made by way of example with reference to the attached drawings, in which:

FIG. 3 is a schematic perspective view of a connecting part of the turbine engine of FIG. 2;

FIG. 3a is a detail view showing an alternative embodiment of a connecting element of the turbine engine; and FIGS. 4 to 8 are schematic partial axial sectional views of the electrical machine of the turbine engine of FIG. 2 and illustrate steps of an assembly method according to the invention.

DETAILED DESCRIPTION

Figure 1:
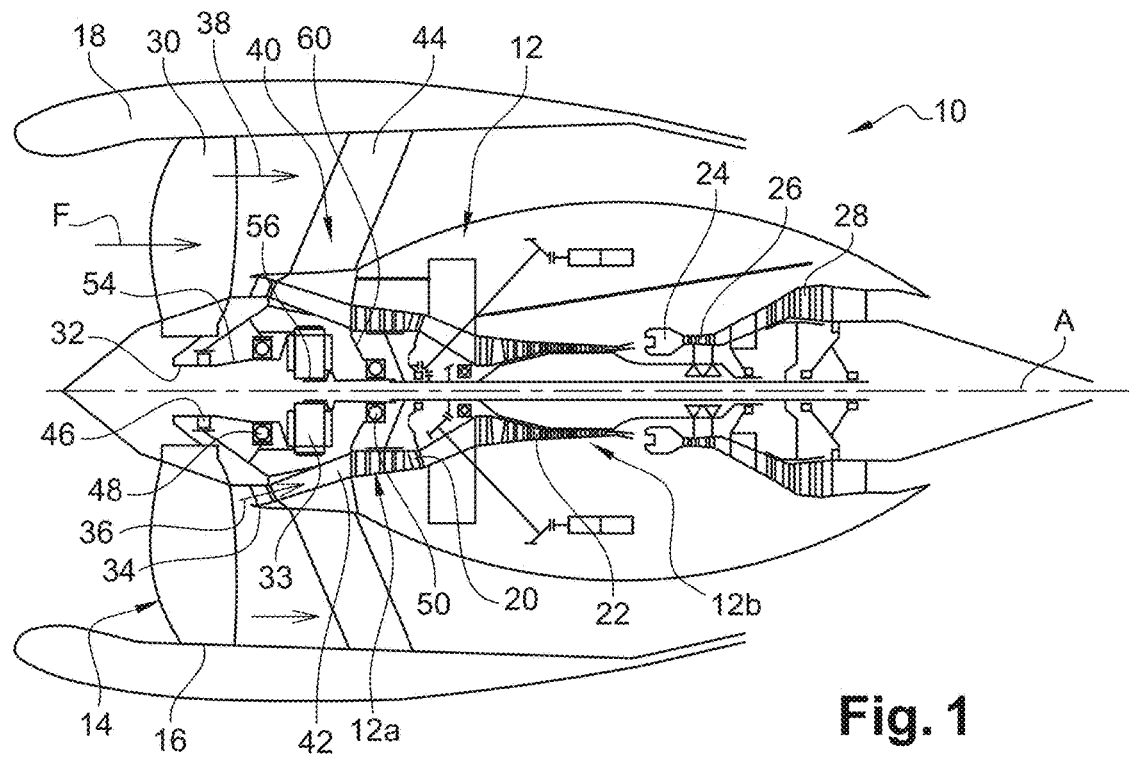
FIG. 1 is a schematic axial sectional view of an aircraft turbine engine with a high bypass ratio and speed reducer.

Reference is first made to FIG. 1, which schematically represents a double body and double flow aircraft turbine engine 10.

The turbine engine 10 conventionally comprises a gas generator 12, upstream of which is arranged a fan 14. The fan 14 is surrounded by a fan casing 16 which is surrounded by a nacelle 18 which extends around and along a major part of the gas generator 12.

The gas generator 12 comprises here two bodies, namely a low-pressure body 12a or LP and a high-pressure body 12b or HP. Each body comprises a compressor and a turbine.

The terms "upstream" and "downstream" are considered along a main direction F of gas flow in the turbine engine 10, this direction F being parallel to the longitudinal axis A of the turbine engine.

From upstream to downstream, the gas generator 12 comprises a low-pressure compressor 20, a high-pressure compressor 22, a combustion chamber 24, a high-pressure turbine 26 and a low-pressure turbine 28.

The fan 14 comprises an annular row of vanes 30 rotated by a fan shaft 32 which is connected to the rotor of the low-pressure body 12a via a speed reducer 33. The gas flow through the fan (arrow F) is separated upstream of the gas generator 12 by an annular splitter 34 into a radially inner annular flow, referred to as the primary flow 36 which supplies the gas generator 12, and into a radially outer annular flow, referred to as the secondary flow 38 which flows between the gas generator 12 and the nacelle 18 and provides most of the thrust of the turbine engine.

An inlet casing 40 structurally connects the gas generator 12 to the fan casing 16 and the nacelle 18. The inlet casing 40 comprises an annular row of radially inner arms 42 extending into the primary flow 36, and an annular row of radially outer guide vanes 44 (OGV type) extending into the secondary flow 38. The arms 42 are generally limited in number (less than ten) and are tubular and have auxiliaries passing through them. The number of vanes 44 (OGV) is generally greater than ten.

The rotor of the low-pressure body 12a and the fan shaft 32 are guided upstream by bearings 46, 48 and 50. These bearings 46, 48, 50 are of the ball or roller type and each comprise an inner bearing ring mounted on the shaft to be guided, an outer bearing ring carried by an annular bearing support and a rolling element between the bearing rings.

Figure 2:
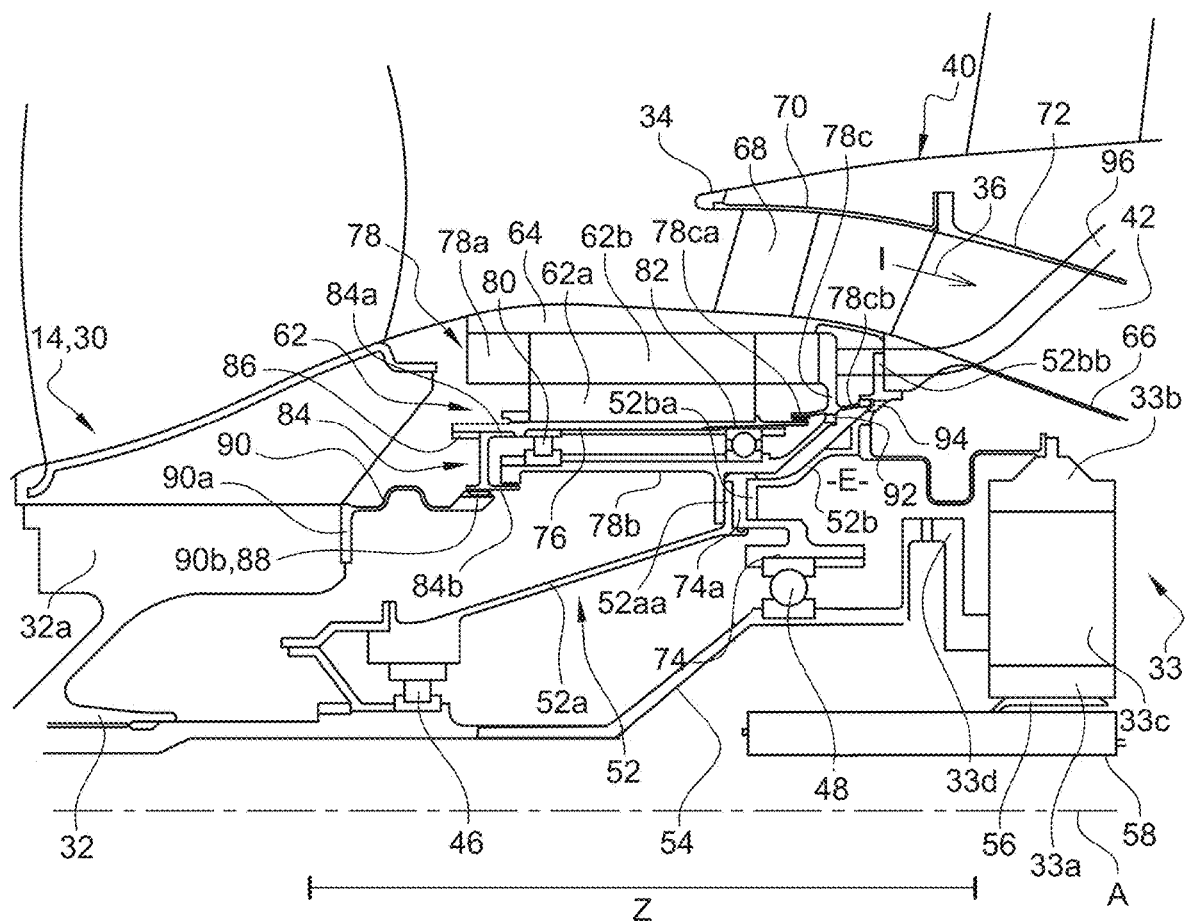
FIG. 2 is a partial schematic half-view in axial section of an aircraft turbine engine according to the invention equipped with an electrical machine.

In a known manner, the speed reducer 33 is of the epicyclic type and comprises a sun gear 33a centred on the axis A, a ring gear 33b extending around the axis and planet gears 33c which mesh with the sun gear and the ring gear and are carried by a planet gear carrier 33d (the references 33a-33d being visible in FIG. 2 in particular).

In the example shown, the ring gear 33b is fixed and fixedly connected to a support 52 of the bearings 46, 48. The planet carrier 33d is rotatable and connected to an output shaft 54 of the speed reducer which further comprises an input shaft 56 meshed with the sun gear 33a. The input shaft 56 is coupled to the main shaft 58 of the low-pressure body, and the output shaft 54 is coupled to the fan shaft 32.

The input shaft 56 is guided by the bearing 50 which is carried by a bearing support 60 (FIG. 1). The output shaft 54 is guided by the bearings 46, 48.

The bearing supports 52, 60 extend around the axis A and are fixed parts connected to the stator and for example to the inlet casing 40.

FIG. 2 is a larger scale view of a part of FIG. 1, and in particular of the area Z located between the fan disc 32a and the speed reducer 33, in which an electrical machine 62 is installed.

In addition to being delimited axially, upstream, by the fan disc 32a, and downstream, by the speed reducer 33, this area Z with annular shape is delimited radially on the inside by the output shaft 54 of the speed reducer and radially on the outside by the elements which delimit internally the flow duct I of the primary flow 36. These elements comprise, on the one hand, an annular shell 64 located upstream and an internal annular wall 66 located downstream, which forms part of the inlet casing 40 as it is connected to the radially internal ends of the arms 42.

The wall 66 extends as an extension of the shell 64 which is an inner shell and is connected by an annular row of fixed vanes 68 to an outer shell 70. The shells 64, 70 define between them the air inlet of the flow duct I of the primary flow 36. The shell 70 extends between the aforementioned splitter 34 and an outer annular wall 72 located downstream of the shell 70 and which forms part of the inlet casing 40 as it is connected to the radially outer ends of the arms 42.

The annular area Z is divided into two annular portions, respectively upstream and downstream, by the bearing support 52. In the example shown, this support has a generally frustoconical shape flaring in the downstream direction. Its upstream and radially inner end carries the outer bearing ring of the bearing 46, the inner bearing ring of which is attached to the output shaft 54. The downstream and radially outer end of the support 52 is attached to the inlet casing 40.

The outer bearing ring of the or each bearing 48 is attached to the support 52, substantially in the middle, the or each inner bearing ring being attached to the output shaft 54. For this purpose, the bearing support 52 comprises two annular sections, respectively upstream 52a, and downstream 52b. The upstream section 52a extends from the bearing 46 to a radially outer annular flange 52aa, and the downstream section 52b extends from a radially inner annular flange 52*ba* to a radially outer annular flange 52*bb* for attachment to the upstream end of the inlet casing 40.

The or each outer bearing ring of the bearing 48 is attached to an annulus 74 which comprises a radially outer annular flange 74*a* interposed between the flanges 52*aa* and 52*ba*. These flanges 52*aa*, 74*a*, 52*ba* are applied axially against each other and comprise orifices for the passage of screw-nut type attachment means.

The downstream portion of the area Z represents a part of an enclosure for lubricating the bearings 46, 48 and 50 as well as the speed reducer 33 which is housed in this enclosure, being arranged axially between the bearings 46, 48, on the one hand, and the bearing 50, on the other hand. An oil mist prevails in this enclosure.

The upstream portion of the area Z represents the place of installation of the electrical machine 62, which is therefore isolated from the enclosure E by the bearing support 52.

The machine 62 has a generally annular shape and comprises a rotor 62*a* and a stator 62*b*. The rotor 62*a* has a generally cylindrical shape extending about the axis A and is carried by a support element 76 which itself has a generally cylindrical shape. The rotor 62*a* is arranged around this element 76.

The stator 62*b* also has a generally cylindrical shape and is integrated with an annular member 78 having a generally C-shaped axial section. This member 78 comprises two annular portions, respectively inner 78*b* and outer 78*a*, which extend around each other and whose downstream ends are connected by an annular bottom 78*c*. The member 78 thus defines an opening which is here oriented axially upstream and in which the rotor 62*a* and the support element 76 are housed.

The stator 62*b* is integrated with the outer portion 78*a* of the member or forms this outer portion 78*a*. This outer portion 78*a* is surrounded, in this case directly by the shell 64.

The bottom 78*c* of the member 78 comprises an annular web 78*cb* extending axially downstream and sealingly cooperating with the bearing support 52. The seal is provided by a labyrinth seal, the annular lips of which are, for example, carried by the web 78*cb* and the abradable coating is carried by the bearing support 52.

The bottom 78*c* further comprises an annular web 78*ca* extending axially upstream and thus into the opening and sealingly cooperating with the downstream end of the support element 76. The seal is provided by a labyrinth seal, the annular lips of which are carried, for example, by the support element 76 and the abradable coating is carried by the web 78*ca*.

The portion 78*b* of the member 78 extends radially inside the rotor 62*a* and the support element 76 and bearings 80, 82 are mounted between this element 76 and the portion 78*b* in order to guide the rotor 62*a* in rotation with respect to the stator 62*b*. The portion 78*b* thus forms a support for the bearings 80, 82.

The bearings 80, 82 are here two in number and axially spaced from each other. The upstream bearing 80 is of roller bearing type and the downstream bearing 82 is of ball bearing type.

An annular closure element 84 is fitted and attached to the upstream end of the support element 76. This closure element 84 has a generally radial orientation and is attached by its outer periphery to the upstream end of the element 76. The element 84 comprises at its outer periphery a cylindrical rim 84*a* which is axially clamped against an inner annular rib of the support element 76 by a nut 86 axially fitted from upstream.

The inner periphery of the element 84 has an internal diameter less than the major internal diameter of the portion 78*b* of the member and carries a series of internal rectilinear splines 88. The inner periphery of the element 84 further comprises an annular web 84*b* extending axially downstream and sealingly cooperating with the upstream end of the portion 78*b*. The seal is provided by a labyrinth seal, the annular lips of which are carried, for example, by the web 84*b* and the abradable coating is carried by the portion 78*b*.

An annular connecting element 90 is used to drive the rotor 62*a*. This element 90 is generally cylindrical in shape and comprises at its upstream end an annular flange 90*a* for attachment to the fan disc 32, and at its downstream end a series of splines 90*b* for coupling to the splines 88. FIG. 3 shows that this element 90 advantageously comprises an annular row of through slots 90*c* passing through in the radial direction, giving this element a certain torsional flexibility. The slots are oval and elongated in the example shown and delimit between them connecting bridges 90*d* which are thinned substantially in their middle. Because of the flexibility of this element 90, the machine 62 is independent of any movement of the fan during operation. Another way of ensuring the flexibility of this element 90 would be to form an omega shape (Q) in cross-section for the part forming the connection between the flange 90*a* and the splines 90*b* (see FIG. 3*a*). The element 90 then has a general bellows shape and could comprise several successive omega shapes.

The splines 88, 90*b* can advantageously be of the swivel type to isolate the machine as much as possible from the rest of the engine.

The bearings 80, 82 are advantageously lubricated and are located in a mini annular lubrication enclosure which is sealed upstream by the joint between the web 84*b* and the portion 78*b*, and downstream by the joint between the web 78*ca* and the element 76 (see FIG. 4). The lubricating oil for the bearings 80, 82 is intended to be discharged from this mini enclosure through axial holes 92 provided in the bottom 78*ca*, just at the inner periphery of the webs 78*ca* and 78*cb*. These holes 92 allow oil to enter an annular space extending between the bottom 78*c* and the section 52*b* of the bearing support 52. Axial holes 94 are further provided on this section 52*b*, substantially opposite the holes 92, for this oil to enter the enclosure and be discharged as part of the oil discharge from this enclosure. It is thus understood that the lubricating oil from the bearings 80, 82 will centrifugally flow to the web 78*ca*, pass through the holes 92, flow onto the web 78*cba*, and then pass through the holes 94 to the lubrication enclosure of the speed reducer 33.

The oil may be discharged through one of the arms 42 of the inlet casing 40. Another of the arms 42 may be used to convey the feed oil from the bearings 80, 82, to the aforementioned mini enclosure.

The stator 62*b* is connected by an electrical cable 96 to a control circuit, this cable 96 passing here through a tubular arm 42 of the inlet casing 40.

One of the particularities of this installation lies in the fact that the electrical machine 62 and in particular its stator 62*b* is located as close as possible to the main flow F after passing through the fan 14 and/or the primary flow 36. This enables, on the one hand, to have an electrical machine with a large diameter and therefore with a higher potential power than the technologies proposed up to now, and on the other hand, to have a machine which is cooled by the aforementioned flow or flows. In a particular embodiment of the invention, 30 MW could be dissipated by this cooling.

For this purpose, the shell 64 which extends, preferably directly, around the stator or at least the portion 78a in which the stator is integrated, has its radially outer surface swept by the gas flows and may further have an aerodynamic profile, as shown in the drawing. The shell 64 ensures the heat exchange by thermal conduction between the stator 62b and the air flow.

FIGS. 4 to 8 illustrate assembly steps of the turbine engine 10 and in particular of modules of this turbine engine.

A first step illustrated in FIG. 4 consists of assembling the machine 62 and in particular inserting the rotor 62a, the support element 76 and the bearings 80, 82 into the opening of the member 78. The assembly is then locked by the closure element 84 which is attached to the support element 76.

The machine 62 is then mounted inside the shell 64, which is secured with the vanes 68 and the shell 70. As shown in FIG. 5, it is sufficient to translate the assembly shells 64 and 70 and vanes 68 onto and around the stator 62b of the machine and then attach the shell 64 to the stator 62b, for example by means of screws for clamping an upstream flange of the shell 64a to an upstream radial face of the stator 62b or the external portion 78a of the member.

Figure 6:
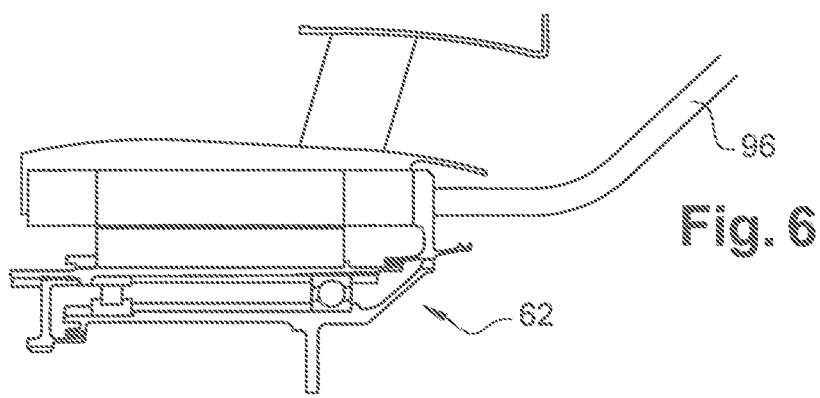
Figure 7:
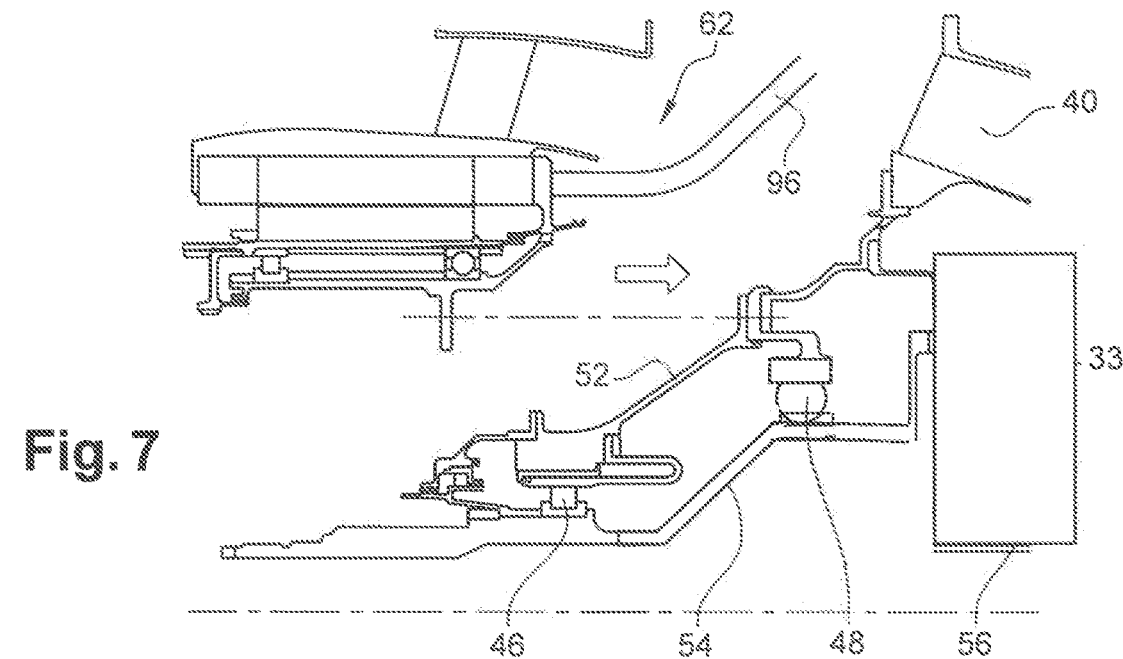
Figure 8:
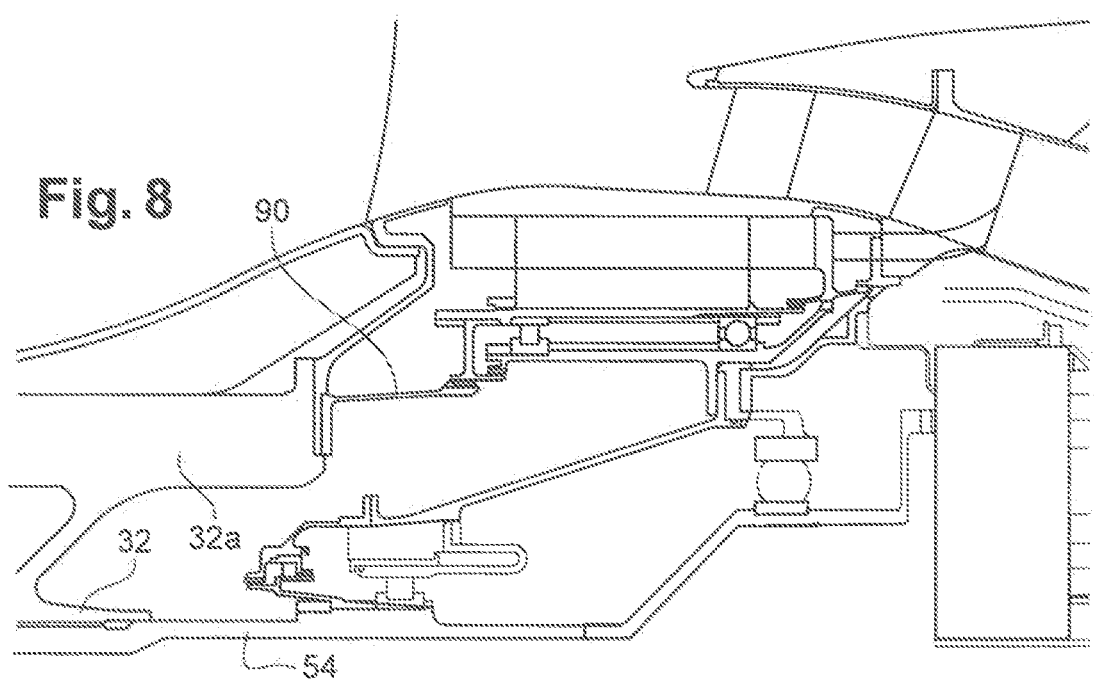

The next step illustrated in FIG. 6 consists of connecting the machine 62 to the electrical cable 96.

The assembly thus obtained is then fitted to a module of the turbine engine comprising, in particular, the inlet casing 40, the bearing support 52, the bearings 46, 48, the speed reducer 33 and its input and output shafts 56 and 54, or even the low-pressure body.

Finally, the fan 14 comprising the disc 32a and the shaft 32 are fitted by axial translation from upstream until the shaft 32 is coupled with the output shaft 54 and the connecting element 90 is coupled with the closure element 84. The fan shaft 32 is further rigidly attached to the output shaft 54 of the speed reducer 33.

The invention claimed is:

1. A fan module for an aircraft turbine engine, this module comprising a fan and an electrical machine, characterised in that the electrical machine is coaxially mounted downstream of the fan and comprises a rotor coupled to rotate with the fan and an annular member with generally C-shaped axial cross-section, the opening of which is axially facing and receives said rotor, the annular member comprising a radially outer portion forming a stator, and a radially inner portion forming a support for bearings guiding the rotor, said rotor disposed radially between said radially outer portion and said radially inner portion.

2. The module according to claim 1, wherein the electrical machine is housed in an annular space bounded upstream by a fan disc, and downstream by an additional annular support for bearings guiding a fan shaft.

3. The module according to claim 2, wherein said member is attached to said additional annular support, said member and said additional annular support comprising holes for oil discharge from the opening of the member axially downstream.

4. The module according to claim 1, wherein the rotor is carried by a substantially cylindrical support element, the downstream end of which sealingly cooperates with a portion of the annular member that defines the opening, and the upstream end of which receives a closure element which sealingly cooperates with an upstream free end of said radially inner portion of the member.

5. The module according to claim 4, wherein said closure element comprises a series of internal rectilinear splines for coupling to a series of external rectilinear splines of a connecting element to a fan disc.

6. The module according to claim 5, wherein said connecting element comprises an annular row of radially through slots and/or said connecting element is generally bellows shaped in cross-section, to provide flexibility, particularly in torsion, to this connecting element.

7. The module according to claim 1, wherein the stator of the electrical machine is surrounded by a first annular shell which is connected by fixed vanes to a second annular shell extending around the first shell, these first and second shells delimiting between them an inlet of a flow duct of a primary flow.

8. The module according to claim 7, wherein the first shell has a radially outer annular surface which has an aerodynamic profile and which is swept by a main flow and/or the primary flow.

9. An aircraft turbine engine, comprising a gas generator and a fan module according to one of claims 1-8, the fan module comprising a fan arranged upstream of the gas generator and configured to generate a main gas flow, part of which flows into a duct of the gas generator to form a primary flow, and another part of which flows in a duct around the gas generator to form a secondary flow, the turbine engine further comprising the electrical machine, wherein said stator is configured to be cooled by the main flow and/or the primary flow.

10. A method of modular assembly of a turbine engine according to claim 9, comprising the steps of:
  (a) assembling the electrical machine,
  (b) mounting the electrical machine radially within a first shell, which is secured to a second shell by fixed vanes,
  (c) mounting the resulting assembly on a first annular support for bearings guiding a fan shaft, and
  (d) connecting a fan disc to said fan shaft.

11. A fan module for an aircraft turbine engine, this module comprising a fan and an electrical machine, wherein the electrical machine is coaxially mounted downstream of the fan and comprises a rotor coupled to rotate with the fan and an annular member with generally C-shaped axial cross-section, the opening of which is axially facing and receives said rotor, a stator being integrated with the annular member, and a radially inner portion of the annular member forming a support for bearings guiding the rotor, said rotor disposed radially between said stator and said radially inner portion.

12. The fan module according to claim 11, wherein the stator is integrated with a radially outer portion of the annular member.

13. A fan module for an aircraft turbine engine, this module comprising a fan and an electrical machine, wherein the electrical machine is coaxially mounted downstream of the fan and comprises a rotor coupled to rotate with the fan and an annular member with generally C-shaped axial cross-section, the opening of which is axially oriented and receives said rotor, the annular member comprising a radially outer portion forming a stator, and a radially inner portion forming a support for bearings guiding the rotor,
  the rotor being carried by a substantially cylindrical support element, the downstream end of which sealingly cooperates with a portion of the annular member that defines the opening, and the upstream end of which receives a closure element which sealingly cooperates with an upstream free end of said radially inner portion of the annular member, said closure element comprising a series of internal rectilinear splines for coupling to a series of external rectilinear splines of a connecting element to a fan disc.

\* \* \* \* \*